United States Patent

Kusano

Patent Number: 5,412,786
Date of Patent: May 2, 1995

[54] DATA PRE-FETCH CONTROL DEVICE

[75] Inventor: Yoshihiro Kusano, Kawasaki, Japan

[73] Assignee: Fujitsu Limited, Kawasaki, Japan

[21] Appl. No.: 158,318

[22] Filed: Nov. 29, 1993

[30] Foreign Application Priority Data

Nov. 30, 1992 [JP] Japan ................................ 4-320407

[51] Int. Cl.[6] ............................................. G06F 9/40
[52] U.S. Cl. .................................. 395/375; 364/938;
364/948; 364/243.4; 364/261.3
[58] Field of Search ................................ 395/375, 800

[56] References Cited

U.S. PATENT DOCUMENTS

| | | | |
|---|---|---|---|
| 4,764,861 | 8/1988 | Shibuya | 395/375 |
| 4,943,908 | 7/1990 | Emma | 395/375 |
| 4,984,154 | 1/1991 | Hanatani | 395/375 |
| 5,142,634 | 8/1992 | Fite | 395/375 |
| 5,168,557 | 12/1992 | Shibuya | 395/375 |

Primary Examiner—David Y. Eng
Attorney, Agent, or Firm—Staas & Halsey

[57] ABSTRACT

A data processing device having a CPU and a memory device includes a unit for temporarily storing information concerning a predicted access which is expected to occur subsequent to the occurrence of an access. The unit is searched to obtain a predicted access address, which is activated in advance, so that data can be efficiently pre-fetched.

3 Claims, 8 Drawing Sheets

APCT

| | SEARCH ADDRESS (2 LOW-ORDER BYTES) | PREDICTED ADDRESS | V |
|---|---|---|---|
| --- | --- | --- | --- |
| 64 | 5560 | 645570 | 1 |
| 65 | 1320 | 651520 | 1 |
| 66 | 1111 | 000001 | 0 |
| 67 | --- | --- | --- |

DATA PRE-FETCH CONTROL DEVICE

BACKGROUND OF THE INVENTION

1. Field of the Invention

The present invention generally relates to data pre-fetch control devices, and more particularly to a data pre-fetch control device which predicts data to be accessed next on the basis of history information concerning the address used when a central processing unit accesses a storage unit and which pre-fetches predicted data whereby the access time can be substantially reduced.

2. Description of the Prior Art

Nowadays, the processing speed of central processing units is quite different from that of main memory devices. Normally, the central processing units can operate several times as fast as the main memory devices. Of course, there are available storage elements operable at an access speed corresponding to the processing speed of central processing units. However, such storage elements are expensive, and are not suitable for constituting main memory devices required to store a large amount of information.

Assuming that a high-speed central processing unit is a consumer who utilizes data and a low-speed main memory device is a supplier who supplies the consumer with data, data may be in a short supply at the consumer side. In this case, the central processing unit wastes much time before data is received from the main memory device. Hence, the processing performance is degraded.

In order to reduce the data waiting time of the central processing unit, a high-speed buffer device is provided between the central processing unit and the main storage unit. Normally, such a buffer device has a storage capacity less than that of the main memory unit. The buffer device absorbs the difference between the processing speeds of the central processing unit and main memory unit. Generally, buffer devices as described above are called cache memories.

A data pre-fetch method is known as another technique designed to reduce the data waiting time. Two types of data pre-fetch methods are known, one of which employs branch prediction, and the other is not limited to branch prediction.

The branch-prediction-based data pre-fetch method predicts an instruction to be executed next after a branch instruction in order to prevent a disturbance of a pipeline for execution of the branch instruction. More particularly, the following prediction methods are known.

In the first prediction method, a branch history table is referred to by using, as a key, an address indicating a memory area in which a branch instruction is stored. Thereby, an instruction related to the branch destination is obtained and executed.

In the second prediction method, a branch history table is referred to by using, as a key, an address indicating a memory area in which a branch instruction is stored. Thereby, the address of the branch destination is predicted, and an instruction is pre-fetched using the above address.

In the third prediction method, a branch history table is referred to by using, as a key, an address indicating a memory area in which a branch instruction is stored. Thereby, it is predicted whether the branch instruction will branch, and the next instruction is pre-fetched based on the result of the above prediction.

In the fourth prediction method, a counter is associated with a branch instruction. The counter is incremented by 1 when a branch occurs, and decremented by 1 when a branch does not occur. Based on the establishment of branching/non-blanching with respect to the branch instruction, the next instruction is predicted and pre-fetched. Data pre-fetch which is not limited to the branch prediction is classified into the following (1) or (2).

(1) A constant a is added to the subject address A of loading, and data pre-fetch is carried out by using $A+a$ as a pre-fetch address.

(2) The cache line next to the subject cache line of loading is used a pre-fetch address.

The above-mentioned data pre-fetch methods based on branch prediction pre-fetch data only when a branch instruction is executed, and are hence effective in a program in which branch instructions do not occur frequently. Further, the above pre-fetch methods are capable of pre-fetching only instructions to be executed next after branch instructions. In other words, data specified by an operand is not subject to pre-fetching. Hence, the conventional pre-fetch method can be used for only limited applications.

In the aforementioned data pre-fetch method which is not limited to branch prediction, data to be accessed is not related to the actual processing logic but is fixed, because data indicated by address $(X+n)$ is pre-fetched. Hence, the prediction does not have a high probability of being correct.

SUMMARY OF THE INVENTION

It is a general object of the present invention to provide a data pre-fetch control system in which the above disadvantages are eliminated, A more specific object of the present invention is to provide a data pre-fetch control system widely applicable and capable of pre-fetching data at an improved probability of successful prediction, The above objects of the present invention are achieved by a data processing device including at least one CPU and at least one memory device. The data processing device includes a predicted address information storage unit storing information concerning a predicted access which is expected to occur subsequent to the occurrence of an access. The data processing device also includes a predicted address searching unit for searching the predicted address information storage unit by using an address associated with an access request from the CPU and for obtaining an address associated with a predicted access. The data processing device further includes predictive access activating unit for activating the predicted access by using the address thereof obtained by the predicted address searching unit. The data processing device further includes address transmission unit for sending the address of the predicted address to the memory device and temporary storage unit for temporarily storing the result of performing the predicted access. The data processing device further includes a match detecting unit for detecting whether the predicted access the next access generated by the CPU. The match detection unit sends the result of performing the predicted access to the CPU when a detection result provided by the match detection unit is affirmative and match detection unit for invalidating the result of the execution of the predicted access when the detection result is negative. The data processing device of the present invention further includes a predicted address register unit for setting history information concerning an address of the access in the predicted address information storage unit, wherein the history information indicates the predicted access.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
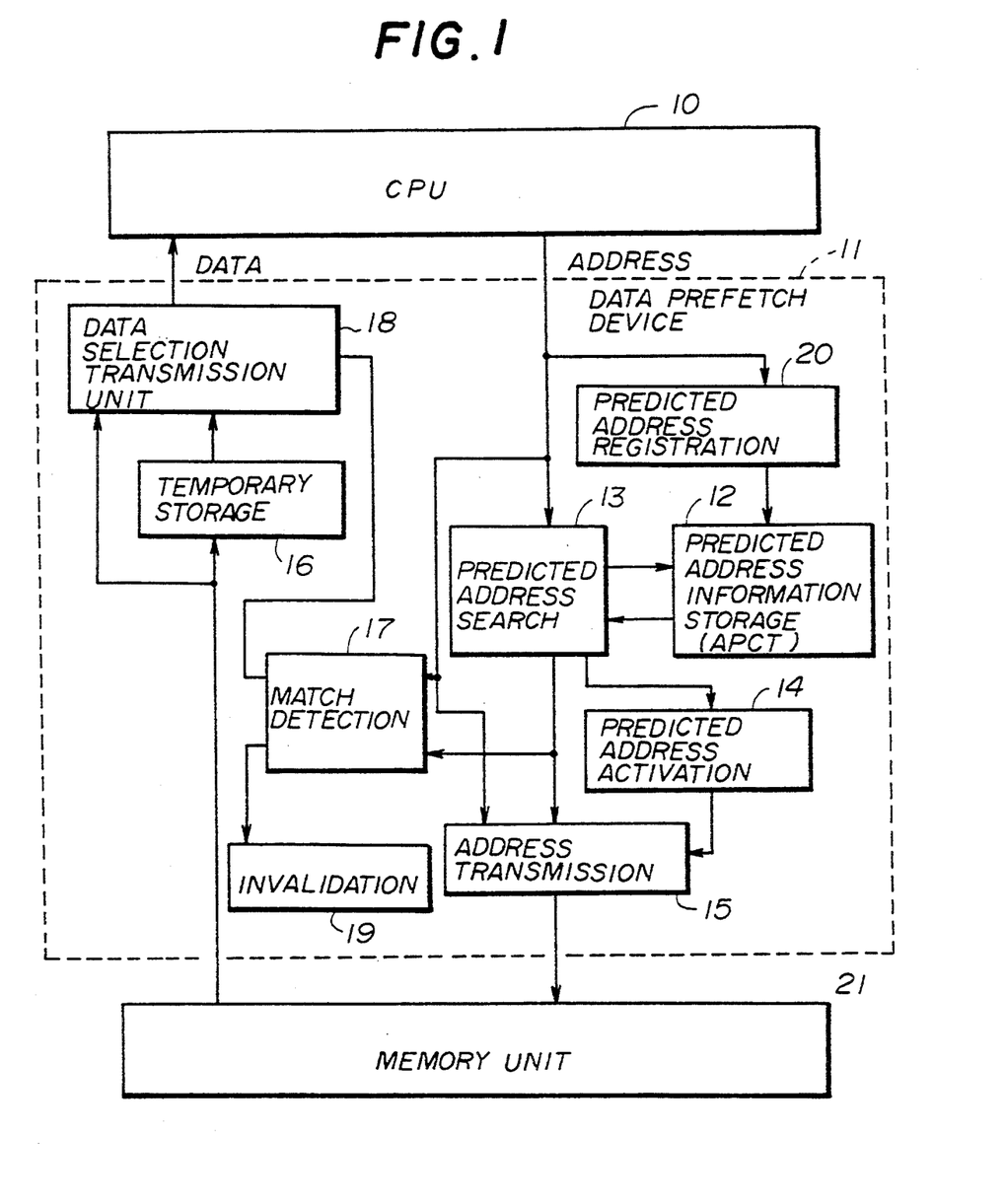
FIG. 1 is a block diagram of the principle of the present invention.

FIG. 1 shows the principle of the present invention. A data pre-fetch control device 11 shown in FIG. 1 is applied to a data processing device including a central processing unit (hereinafter simply referred to as a CPU) 10, and a memory unit 21.

The data pre-fetch control device 11 is configured as follows. A predicted address information storage unit 12 stores information concerning an access predicted to occur subsequently to a given access. A predicted address searching unit 13 searches the predicted address information storage unit 12 by using an address associated with an access request, and obtains the address of an access which is predicted occur next. A predicted access activating unit 14 activates the access relevant to the address obtained by the predicted address searching unit 13. An address transmission unit 15 sends the address to be accessed to the memory unit 21.

A temporary storage unit 16 temporarily stores the result of the predicted access. A match detection unit 17 detects whether or not the predicted access coincides with the next access by a request from the CPU 10. In the affirmative, the match detection unit 17 sends the result of the predicted access stored in the temporary storage unit 16 to the CPU 10 via a data selection transmission unit 18. When the match detection unit 17 detects a mismatch, it activates an invalidating unit 19, which invalidates the received result of the predicted access.

A predicted address registration unit 20 sets history information concerning the address by means of which the predicted address information storage unit 12 is accessed.

Preferably, a temporary storage unit 16 functioning as a cache memory is provided as shown in FIG. 1. Preferably, the predicted address information storage unit 12 is provided within a cache directory in the temporary storage unit 16, that is, a directory to which a storage area for storing information concerning the address of data stored in the temporary storage unit 16.

It will now be assumed that the CPU 10 generates an access request for data stored in address A and subsequently generates an access request for data stored in address B. The predicted address registration unit 20 causes history information concerning the above address generation to be stored in the predicted address information storage unit 12. More particularly, information is registered which indicates that an access to address B has been generated after an access to address A. This address B is referred to as a predicted address.

If the CPU 10 generates a request for an access to address A after the above registration, the data pre-fetch control device 11 performs an access control with respect to address A, and causes the predicted address searching unit 13 to search the predicted address information storage unit 12. Hence, the predicted address searching unit 13 learns that an access to address B was carried out after an access to address A in the past. Then, the predicted address searching unit 13 causes the predicted access activating unit 14 to activate an access to address B. The unit 14 sends address B to the memory unit 21 via the address transmission unit 15, whereby the predicted access to address B subsequent to the access to address A is carried out. In the above manner, data stored in the area indicated by address B is pre-fetched. Data pre-fetched from the above area is temporarily stored in the temporary storage unit 16.

When the CPU 10 generates the next access request, the match detection unit 17 compares the address relative to the next access request with the predicted address previously found by the predicted address searching unit 13. If the result of the above determination is not affirmative, the unit 17 causes the invalidating unit 19 to invalidate the result of the previously predicted access. If the result of the above determination is affirmative, the match detection unit 17 sends data previously stored, in the pre-fetch process, in the area of the temporary storage unit 16 indicated by address B to the CPU 10 via the data selection transmission unit 18.

Generally, a program executed by the CPU 10 frequently executes an identical instruction sequence repeatedly. According to the data pre-fetch control of the present invention, it becomes possible to reduce the data waiting time of the CPU 10 and improve the processing performance.

Further, a large increase in the amount of hardware required can be prevented because the predicted address information storage unit 12 is provided within the cache directory in which the temporary storage unit 16 is provided.

Figure 2A:
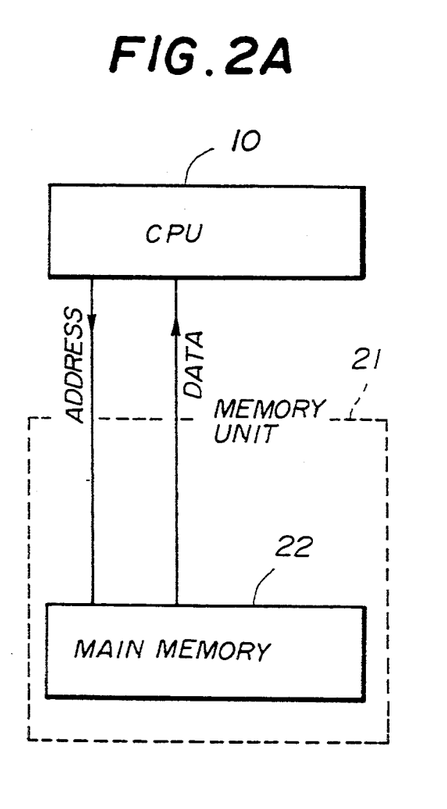
FIG. 2A is a block diagram of a data processing device to which the present invention is applied.
Figure 2B:
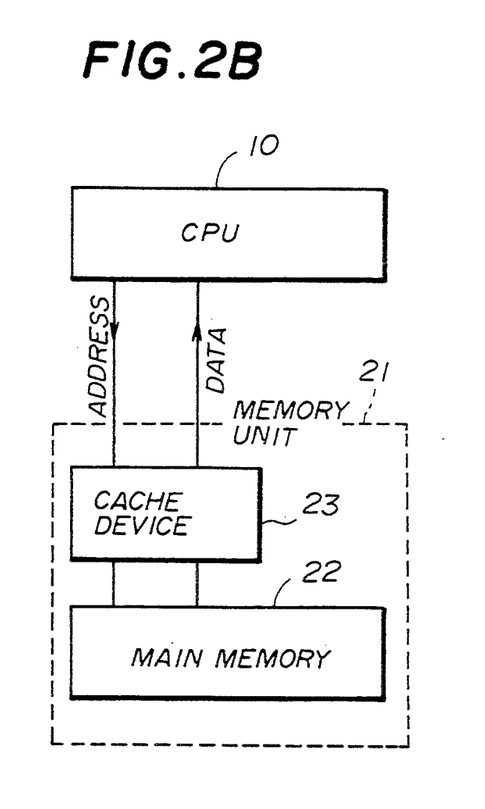
FIG. 2B is a block diagram of another data processing device to which the present invention is applied.

FIGS. 2A and 2B show data processing devices to which the present invention is applied. As shown in these figures, a data processing device to which the present invention is applied includes at least one CPU 10 and at least one memory unit 21. The memory unit 21 includes only a main memory unit 22 (FIG. 2A) or additionally includes a buffer memory such as a cache memory device 23 (FIG. 2B). The buffer memory device 23 may have a hierarchical structure.

Generally, a Harvard-type data processing device and a Princeton-type data processing device are known. In the former device, an access system for instructions is separated from an access system for data. In the latter device, access systems for instructions and data use an identical access system. The present invention is applicable to both types of data processing devices. Further, the present invention can be applied to the Harvard-type data processing device such that the present invention can be separately applied to the instruction system and the data system.

Figure 3:
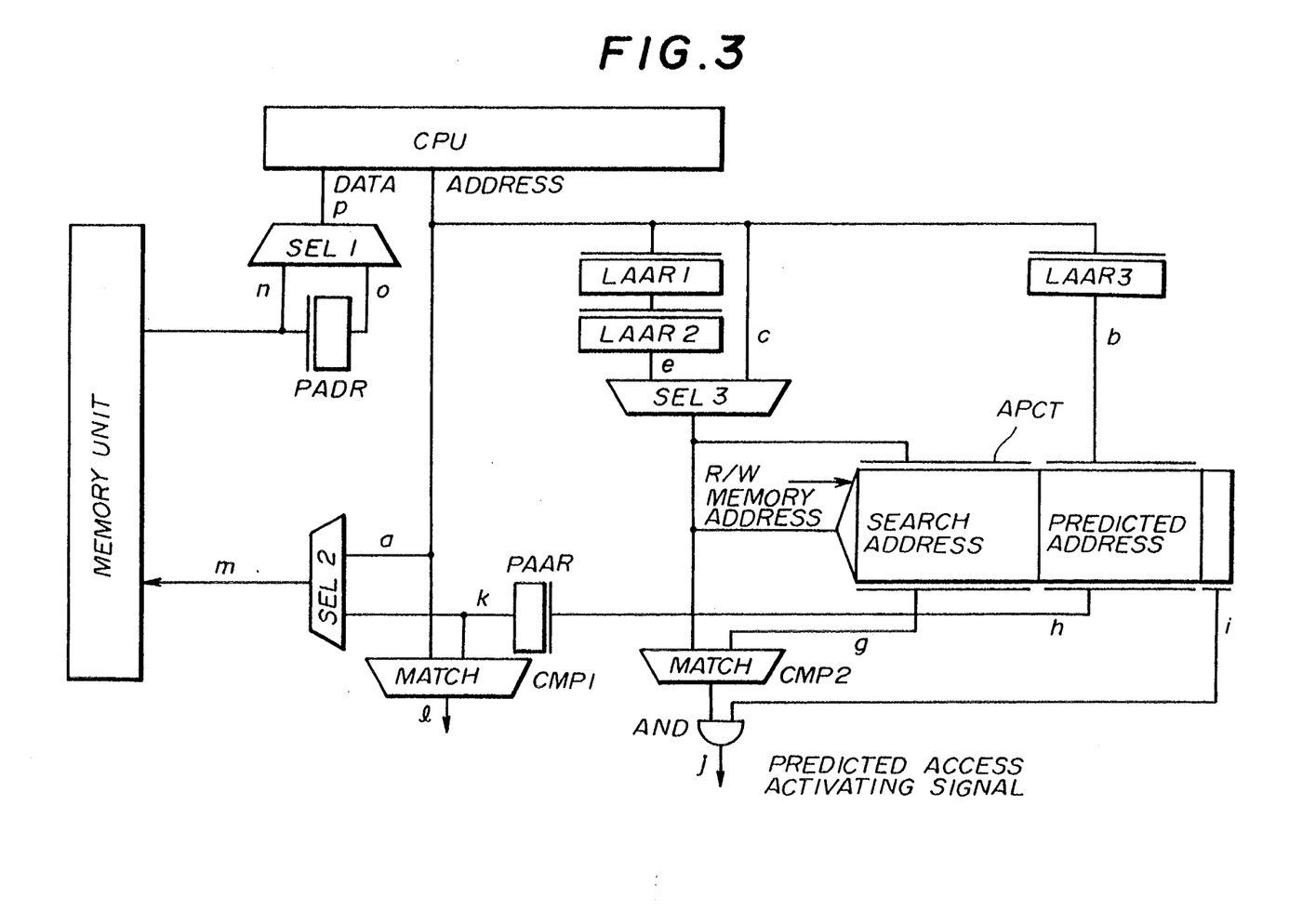
FIG. 3 is a block diagram of an embodiment of the present invention.
Figure 4A:
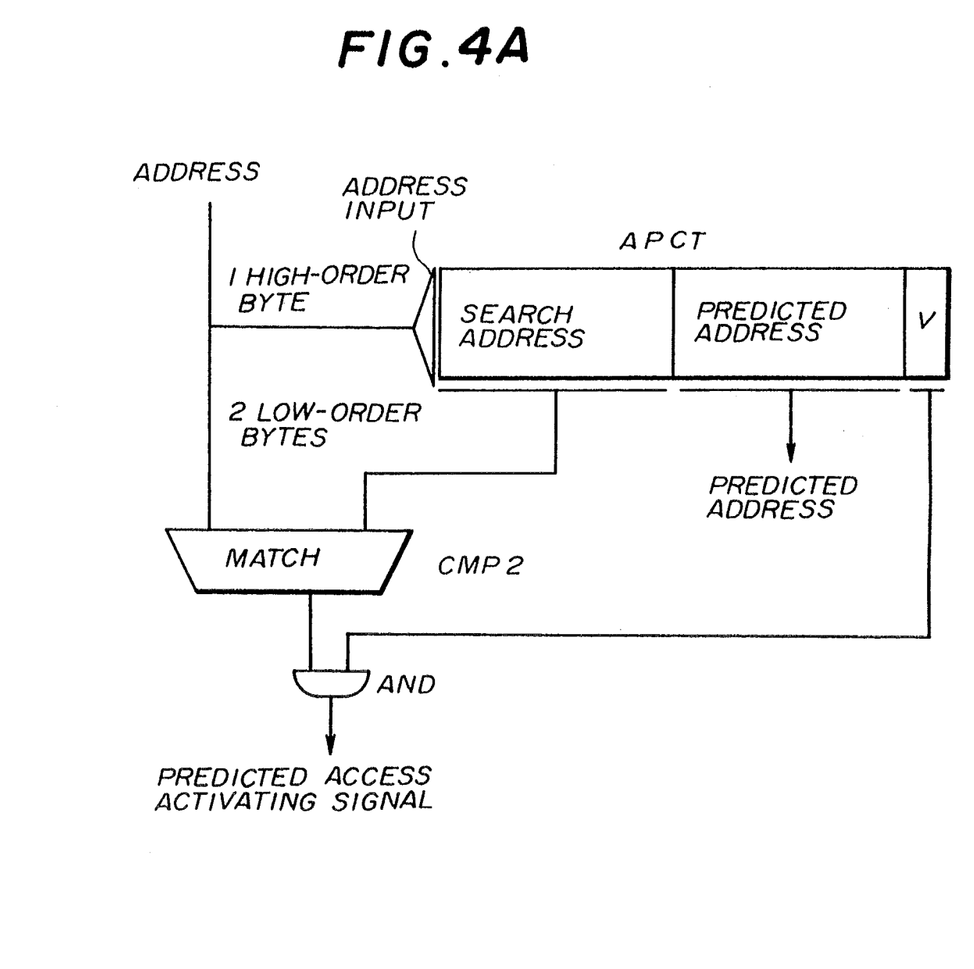
FIGS. 4A and 4B are diagrams showing an APCT searching mechanism used in the embodiment of the present invention.
Figure 4B:
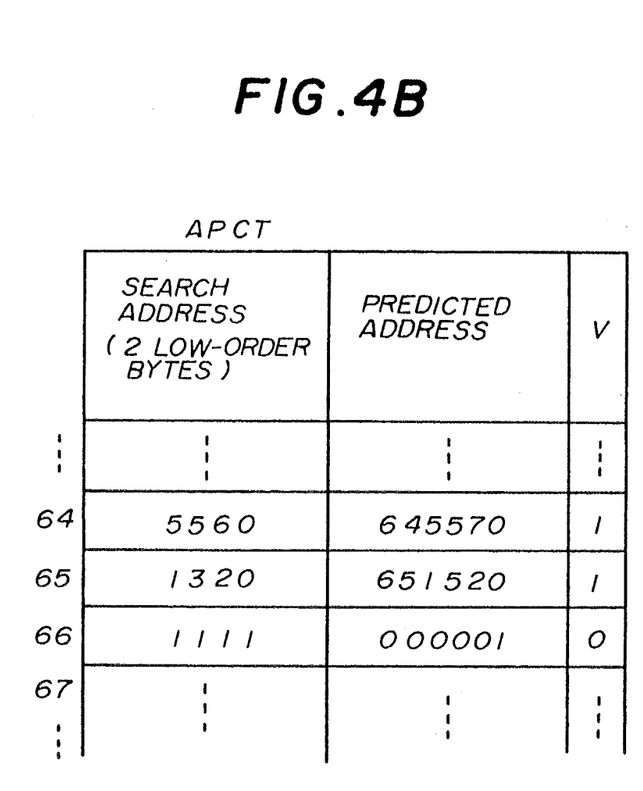
Figure 5A:
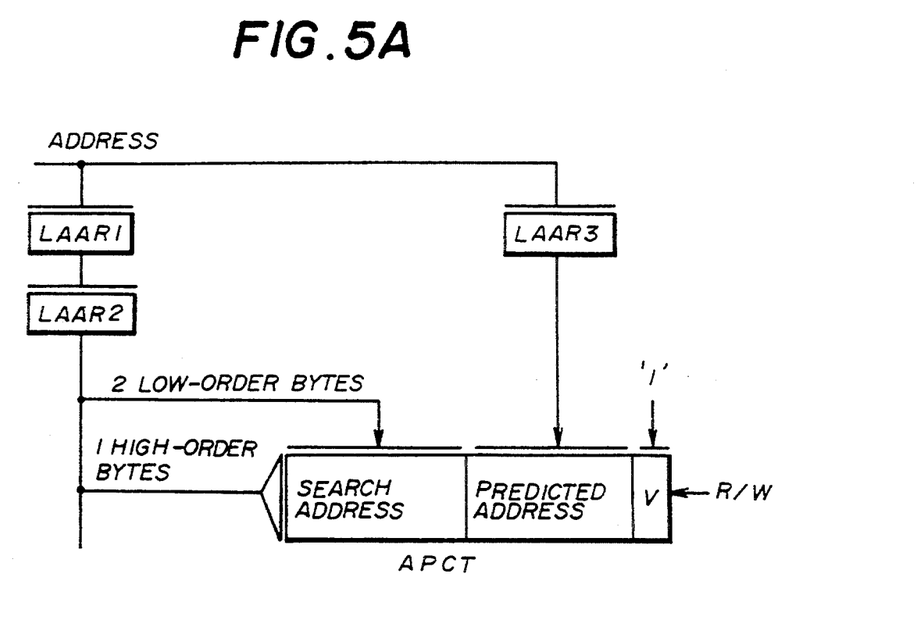
FIGS. 5A and 5B are diagrams showing an APCT registration mechanism used in the embodiment of the present invention.
Figure 5B:
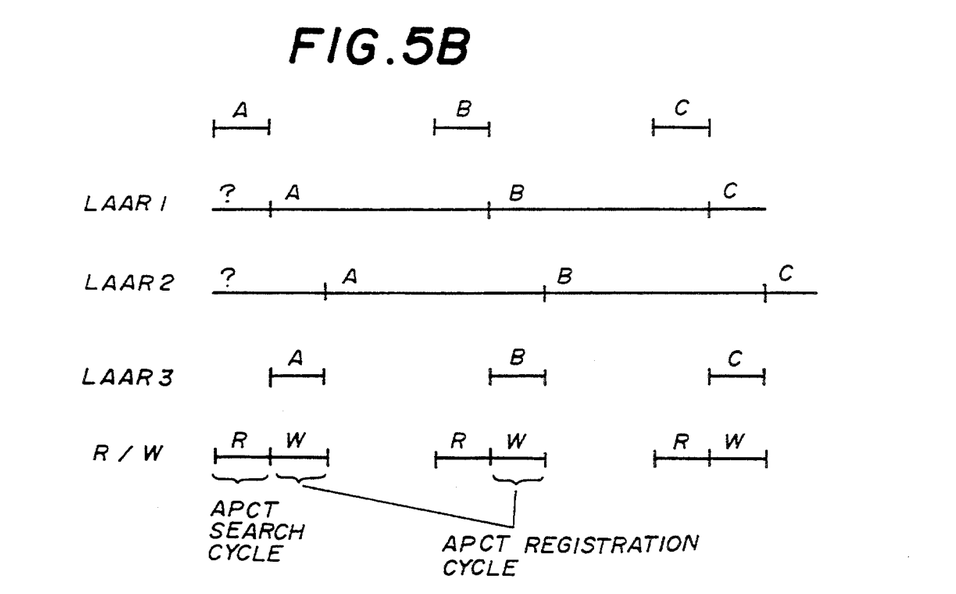
Figure 6:
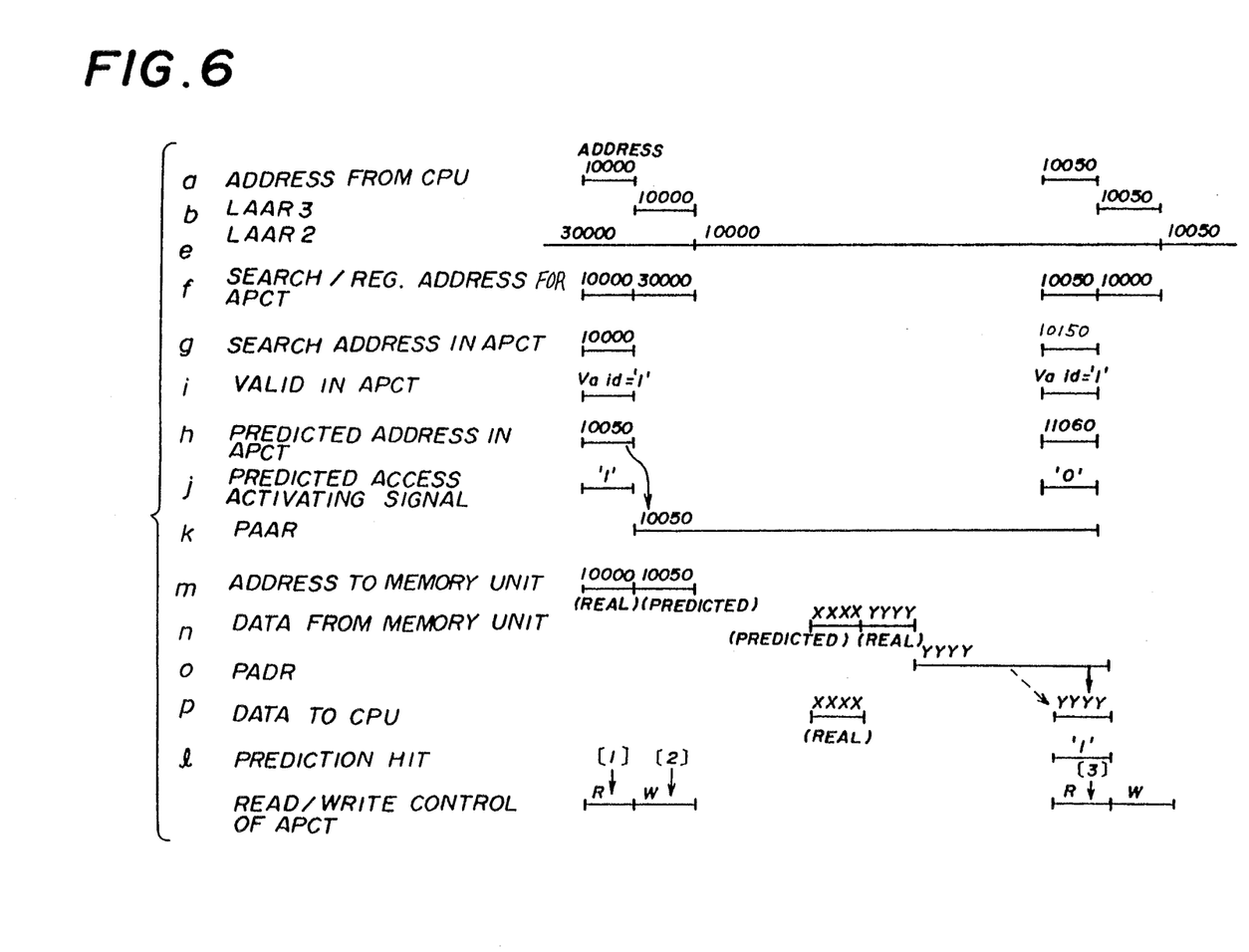
FIG. 6 is a time chart of the operation of the embodiment of the present invention.

FIG. 3 is a block diagram of an embodiment of the present invention, FIGS. 4A and 4B are diagrams showing an APCT searching method carried out in the embodiment of the present invention, FIGS. 5A and 5B are diagrams showing an APCT registration method according to the embodiment of the present invention, and FIG. 6 is a time chart of the operation of the embodiment of the present invention.

Referring to FIG. 3, the label APCT denotes an access pattern chain table, which corresponds to the predicted address information storage unit 12 shown in FIG. 1. The labels LAAR1, LAAR2 and LAAR3 denote last access address registers, which store addresses with which accesses have been carried out. The label PAAR denotes a pre-fetch access address register used to store an address for which data is to be pre-fetched. The label PADR denotes a pre-fetch access data register used to store pre-fetched data. Further, the labels SEL1–SEL3 respectively denote selectors, CMP1 and CMP2 respectively denote match detection circuits, and AND denotes an AND circuit.

In the following description of the embodiment of the present invention, it will be assumed that the address has a length equal to three bytes. Of course, the present invention is not limited to the address of three bytes and is applicable to addresses of arbitrary bytes.

Fetch address a from the CPU 10 is sent to the memory unit 21 via the selector SEL2 and to the registers LAAR1 and LAAR3 and the selector SEL3. In a retrieval cycle for obtaining a predicted address, address c shown in FIG. 3 is selected, and one high-order byte of the three-byte address c is used for searching the table APCT.

More concretely, a searching method as shown in FIGS. 4A and 4B can be employed. Each entry of the table APCT is made up of a search address column, a predicted address column, and a validity indication column V. Originally, it is ideal to allot the entries of the table APCT to all the addresses. However, this increases the amount of hardware required. For the above reason, a method similar to a mapping method used for cache memories is employed in the embodiment being considered.

In the searching operation on the table APCT, one high-order byte of the address is used as an address input to the table APCT, and the content of the search address in the entry is read. Then, it is determined, by the match detection circuit CMP2, whether or not the two low-order bytes of the address coincide with the search address read from the table APCT. If the two addresses coincide with each other, the AND circuit AND performs an AND operation on a match detection signal from the match detection circuit CMP2 and the valid/invalid signal read from the validity indication column V. When the result of the AND operation is '1', it is concluded that the predicted address has been successively found, and the AND circuit AND outputs a predicted address activating signal. Simultaneously, the predicted address registered in the same entry as described above is output.

It will now be assumed that the table APCT has the contents shown in FIG. 4B. If the address from the CPU 10 is "645560", the 64th entry (in hexadecimal notation) in the table APCT is searched. In this case, the two low-order bytes of the addresses coincide with each other, and the entry being considered is assigned the valid signal '1'. Hence, the address "645570" is output as a predicted address. If the address from the CPU 10 is "651320", the 65th entry (in hexadecimal notation) is searched, and "651520" is output as a predicted address.

The invalid indication is given to address "661111", which is indicated as an invalid entry. Hence, it is recognized that a predicted address has not been registered, and the predicted access is prevented.

When the predicted access is activated, the predicted address read from the table APCT is written into the register PAAR, and is sent to the memory unit 21 via the selector SEL2. In the following description, an access requested by the CPU 10 with respect to the predicted access is referred to as a real access.

If the CPU 10 generates an access request, it is checked, by the match detection circuit CMP1, whether or not the previously predicted access and the real access match each other. The following control is carried out based on the result of the match detection.

1) If the next real access occurs before the predicted access ends and the two accesses match each other, the access prediction hits and the real access process is replaced by the predicted access.

2) If the next real access request occurs before the predicted access ends and the two accesses do not match each other, the access prediction misses. At this time, all operations related to the predicted access are invalidated.

3) If the next real access does not occur before the predicted access ends, response data from the memory unit 21 is stored in the register PADR. Thereafter, if the real access occurs, it is checked whether or not the real access matches the predicted access. When it is determined that the real access matches the predicted access, the access prediction hits, and the data stored in the register PADR is sent to the CPU 10. If the result is negative, all results relevant to the predicted access are invalidated.

When the real access occurs, the address of an access which us predicted to subsequently occur is read from the table APCT by accessing it with the present address used as a key. Hence, each time the real access request occurs, the address of the real access is registered in the table APCT in connection with the address of the immediately preceding real access.

FIG. 5A shows a structure for the above address registration, and FIG. 5B is a time chart of the operation of the structure shown in FIG. 5A. It will now be assumed that a real access to address A, a real access to address B and a real access to address C occur in this order. In FIGS. 5A and 5B, the symbol R in "R/W" denotes a search cycle (read) during which the table APCT is searched, and the symbol W therein denotes a registration cycle (write) during which the address is registered in the table APCT.

When address A of the real access is sent from the CPU 10, address A is used to search the table APCT. At the start of the next timing cycle, address A is written into the registers LAAR1 and LAAR3. In the example being considered, LAAR1 and LAAR3 are formed with separate registers. In an alternative, LAAR1 and LAAR3 can be unified and formed with a single register. The content of the register LAAR1 is transferred to the register LAAR2 in the following cycle. For example, in the second registration cycle W shown in FIG. 5B, the registration is carried out so that the content "A" of the register LAAR2 is used as a search address, and the content of the register LAAR3 is used as a predicted address. At the time of the above registration, the valid indication for the entry being considered is set to '1'.

An example of the operation of the structure shown in FIG. 3 will now be described with reference to FIG. 6. The time chart of FIG. 6 shows the following operation. An access to address "10000" occurs. This address has been registered in the table APCT, and hence the predicted address (address "10050") is activated. Thereafter, a real access to address "10050" occurs, which means that the access prediction hits. Symbols a, b, e, f, . . . , p and 1 shown in FIG. 6 correspond to those shown in FIG. 3, and R/W shown in FIG. 6 corresponds to that shown in FIG. 3.

More particularly, in search cycle [1] in the read-/write control of the table APCT shown in FIG. 6, two low-order bytes of the search address g is read from the table APCT in such a manner that address a (address "10000") is set as search address f for the table APCT and one high-order byte of address a is used to read the two-byte search address from the table APCT. Then, the search address f and the search address g registered in and read from the table APCT are compared with each other. In the example shown in FIG. 6, f=g and the validity signal indicates '1'. Hence, predicted access activating signal j is set to '1', and predicted address h (address "10050") registered in the table APCT is written in the register PAAR. Thereby, the content k of the register PAAR is set to "10050".

Address "10000" for the real access and address m for the predicted access to address "10050" are sequentially sent to the memory unit 21.

In the next registration cycle [2], the registration process for the table APCT is carried out in such a manner that the content e (address "30000") of the register LAAR2 is used as a registration address to the table APCT and the real access to address "10000" subsequent to the real access to address "30000" is used as a predicted address.

With respect to the real access to address "10000" of the memory unit 21, data n with a value XXXX is read from the memory unit 21, and is sent to the CPU 10 as data p. Data n with a value YYYY relating to the predicted access to address "10050" is stored in the register PADR because the next access request has not occurred.

Next, when an access request to address "10050" is received from the CPU 10, it is checked whether or not the access request matches the content k of the register PAAR. In the example being considered, the result of the above check is affirmative, and it is recognized that the access prediction hits. Hence, the content o of the register PADR is sent to the CPU 10 without an access to the memory unit 21.

In the search cycle [3] shown in FIG. 6, the table APCT is searched so that the address a ("10050") from the CPU 10 is used as the search address f for the table APCT. In the example being considered, the validity signal indicates '1', while f is not equal to g. Hence, it is recognized that the two search addresses do not coincide with each other, and hence the predicted access is not activated.

Figure 7:
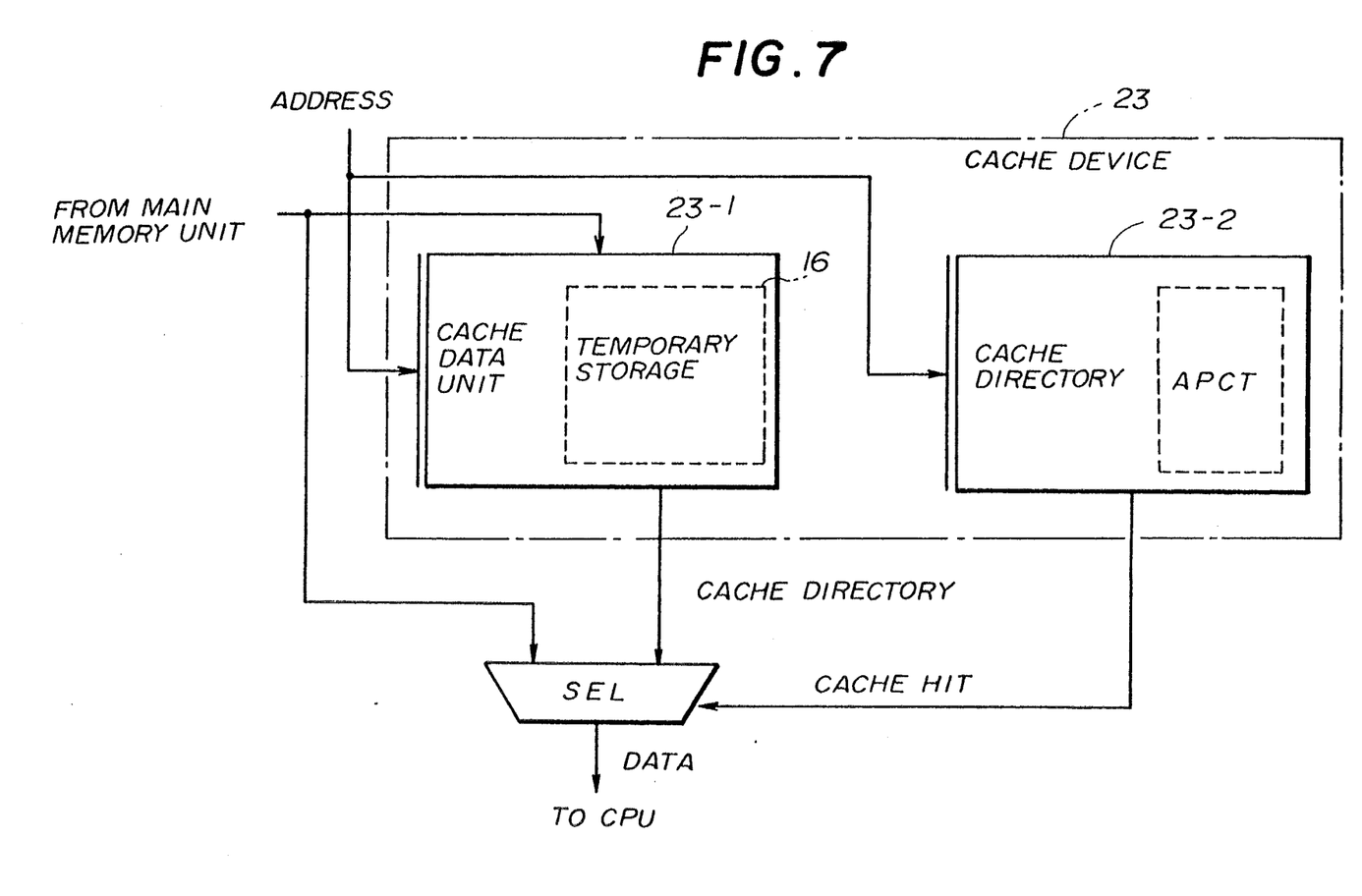
FIG. 7 is a block diagram of another embodiment of the present invention.

A description will now be given, with reference to FIG. 7, of another embodiment of the present invention. FIG. 7 shows a data processing device having the cache memory device 23 as shown in FIG. 2B. The cache memory device 23 shown in FIG. 7 includes a cache data unit 23-1 and a cache directory unit 23-2. The cache data unit 23-1 functions as the temporary storage unit 16.

The operation of the embodiment of the present invention shown in FIG. 7 differs from that of the previous embodiment thereof as follows.

1) If the next real access occurs before the predicted access ends and the above real access makes a cache hit, the step of comparing the predicted access with the real access is not carried out. Data read from the cache data unit 23-1 is sent to the CPU 10 via the selector SEL. One of the following two predicted access ending methods is carried out.

1—1) Response data from the main memory unit is written into the cache device 23. If the next real access matches the predicted access, the next real access certainly makes a cache hit.

1-2) Response data from the main memory unit is not written into the cache device 23. The predicted access ends without any influence on other processes.

2) If the next real access occurs before the predicted access ends and the above real access causes a cache miss and further if the predicted access and the real access match each other, the real access process is replaced by the predicted access process.

3) If the next real access occurs before the predicted access ends and the above real access makes a cache miss and further if the predicted access and the real access does not match and the next real access request do not occur before the predicted access ends, one of the above two predicted access ending procedures (1—1) and 1-2)) is carried out.

Further, as shown in FIG. 7, it is possible to install the access pattern chain table APCT in the cache directory unit 32-2 of the cache device 23. With this structure, it is possible to reduce the amount of hardware required.

The following applications of the present invention are possible. The present invention can be applied to a Harvard-type cache device in which an instruction cache and a data cache are separately provided in such a manner that the present invention is separately applied to the instruction cache and the data cache. In this case, it is possible for the real access in the instruction system to activate the predicted access in the operand system and for the real access in the operand access to activate the predicted access in the instruction system. In this manner, the instruction system and the data (operand) system can cooperate with each other, so that pre-fetch operations can be further facilitated.

In the aforementioned embodiments of the present invention, the output signal of the access pattern chain table APCT is the address of an access which will occur next. It is also possible to design the output signal of the table APCT so that the above output signal is the difference between the address of an access which will occur next and the address of the current access. With this structure, the sum of the result of the search operation on the table APCT and the address used for search is the address of the predicted access. Thereby, the storage capacity of the table APCT can be reduced.

In the aforementioned embodiments of the present invention, the access which will occur next is predicted. It is also possible to predict an access which occur further in the future. For example, the current access address is used as a search (registration) address, and the search address and the address of an access which is expected to occur two accesses later are paired and stored in the table APCT. This can be easily realized by increasing the number of stages of registers LAAR1 and LAAR2. In this case, the effect of pre-fetching data can be improved while the probability of successful prediction is degraded.

According to the present invention, it is possible to substantially reduce the access time for the memory device by performing the access prediction for the operand system. Further, it is possible to improve the cache hit ratio by storing the results of access prediction in the cache device.

The present invention is not limited to the specifically disclosed embodiments, and variations and modifications may be made without departing from the scope of the present invention.

What is claimed is:

1. A data processing device including at least one CPU and at least one memory device, said data processing device comprising:

first means for storing information concerning a predicted access which is expected to occur subsequent to the occurrence of an access;

second means for searching the first means by using an address of an access request from the CPU to the memory for obtaining an address of the predicted access;

third means for sending the address of the predicted address thereof obtained by the second means to the memory device as a predicted access request when the predicted address of the access request is found in the first means;

fourth means for temporarily stored the predicted access address obtained by the second means;

fifth means for temporarily storing the data responded from the memory as a result of the predicted access request;

sixth means for evaluating whether the next access address generated by the CPU and the predicted access address storing in the fourth means are equal and controlling so that the data is sent to the fifth means to the CPU when equal and the data in the fifth means is invalidated and the access address is sent to the memory as a normal memory access when not equal; and seventh means for setting history information concerning an address of the access to the first means, said history information indicating said predicted access.

2. The data processing device as claimed in claim 1, wherein without the fourth, fifth and sixth means, the data responded from the memory as a result of the predicted access request is stored in a cache memory.

3. The data processing device as claimed in claim 2, wherein said first means is provided as a part of the cache memory of a cache device.

* * * * *